(12) United States Patent
Johns et al.

(10) Patent No.: US 11,590,471 B2
(45) Date of Patent: Feb. 28, 2023

(54) DEVICE AND METHOD FOR LOADING PELLETS INTO REACTOR TUBES

(71) Applicant: Tubemaster, Inc., Louisville, KY (US)

(72) Inventors: Clifford L Johns, Louisville, KY (US); Dennis Patrick McAndrews, Jeffersonville, IN (US); Douglas Keith Cornett, LaGrange, KY (US)

(73) Assignee: Tubemaster, Inc., Louisville, KY (US)

( * ) Notice: Subject to any disclaimer, the term of this patent is extended or adjusted under 35 U.S.C. 154(b) by 61 days.

(21) Appl. No.: 17/120,361

(22) Filed: Dec. 14, 2020

(65) Prior Publication Data

US 2021/0220787 A1 Jul. 22, 2021

Related U.S. Application Data

(60) Provisional application No. 62/950,638, filed on Dec. 19, 2019.

(51) Int. Cl.
*B01J 8/00* (2006.01)
*B01J 8/06* (2006.01)
*B01J 4/00* (2006.01)
*B01J 19/24* (2006.01)

(52) U.S. Cl.
CPC ............... *B01J 8/003* (2013.01); *B01J 4/008* (2013.01); *B01J 8/002* (2013.01); *B01J 8/004* (2013.01); *B01J 8/06* (2013.01); *B01J 19/2425* (2013.01); *B01J 2204/002* (2013.01); *B01J 2208/00752* (2013.01)

(58) Field of Classification Search
CPC ... B01J 8/002; B01J 8/003; B01J 8/004; B01J 8/06; B01J 2208/00752; B01J 4/008; B01J 19/2425; B01J 2204/002
See application file for complete search history.

(56) References Cited

U.S. PATENT DOCUMENTS

| | | | |
|---|---|---|---|
| 3,913,806 A | 10/1975 | Red | |
| 5,897,282 A | 4/1999 | Comardo | |
| 2015/0114516 A1 | 4/2015 | Knubben | |
| 2016/0220974 A1 | 8/2016 | Saninord | |

*Primary Examiner* — Lessanework Seifu
(74) *Attorney, Agent, or Firm* — Ducan Galloway; Greenwald PLLC; Kevin T. Duncan

(57) ABSTRACT

A device for loading pellets into reactor tubes includes a portable loading box with a bottom wall defining an opening, a loading tube projecting downwardly from the opening, and a movable dam for dividing said loading box into separate chambers.

10 Claims, 14 Drawing Sheets

DEVICE AND METHOD FOR LOADING PELLETS INTO REACTOR TUBES

BACKGROUND

The present invention relates to an arrangement for loading pellets into the tubes of a chemical reactor.

Many chemical reactors are essentially large shell and tube heat exchanger vessels, with the reaction occurring inside the tubes and a coolant circulating in the vessel outside the tubes. A chemical reactor vessel also can be a simple tank with a single volume of catalyst inside it, or it may be a single large tube. Some chemical reactions occur in furnace or reformer tubes, which may be a part of a system with from 10 to 5,000 or more such tubes. In any of these reactor vessels, catalyst, typically in the form of pellets, may be loaded into the reactor to facilitate the reaction. Inert pellets also may be loaded into the reactor tubes to certain levels, usually at the bottom portion and top portion of each tube. The pellets are replaced periodically.

The reactor tubes may be quite long, housed in a structure several stories tall. In order to replace the pellets, the old pellets first are removed from the reactor tubes. The inside surface of each tube is then mechanically cleaned to remove any scale formed during the chemical reaction process as this scale impedes or retards the reaction by slowing down the heat transfer rate.

As the pellets are loaded back into the reactor tubes, it is desirable to load pellets to certain levels. Often, inert pellets are loaded in the bottom of the tubes to a first level, then catalyst pellets are loaded on top of the inert pellets to a second level, and then inert pellets are loaded on top of the catalyst pellets to a third level, which may be the top of the tubes. In many cases the height of the column of inert pellets at the top of the tubes is on the order of 2 to 10 times the height of inert pellets at the bottom of the tubes.

SUMMARY

The present invention relates to an arrangement for loading pellets in one or more tubes in a reactor vessel and loading those pellets to a desired level. The first embodiment described below preferably is used to load the top layer of pellets. The second embodiment described below can be used to load the charge of inert pellets at the bottom of the tube and the charge of inert pellets at the top of the tube, or any specific charge of pellets at any position of the reactor tube, even though the amounts of pellets in those respective charges are quite different.

DESCRIPTION

Figure 1:
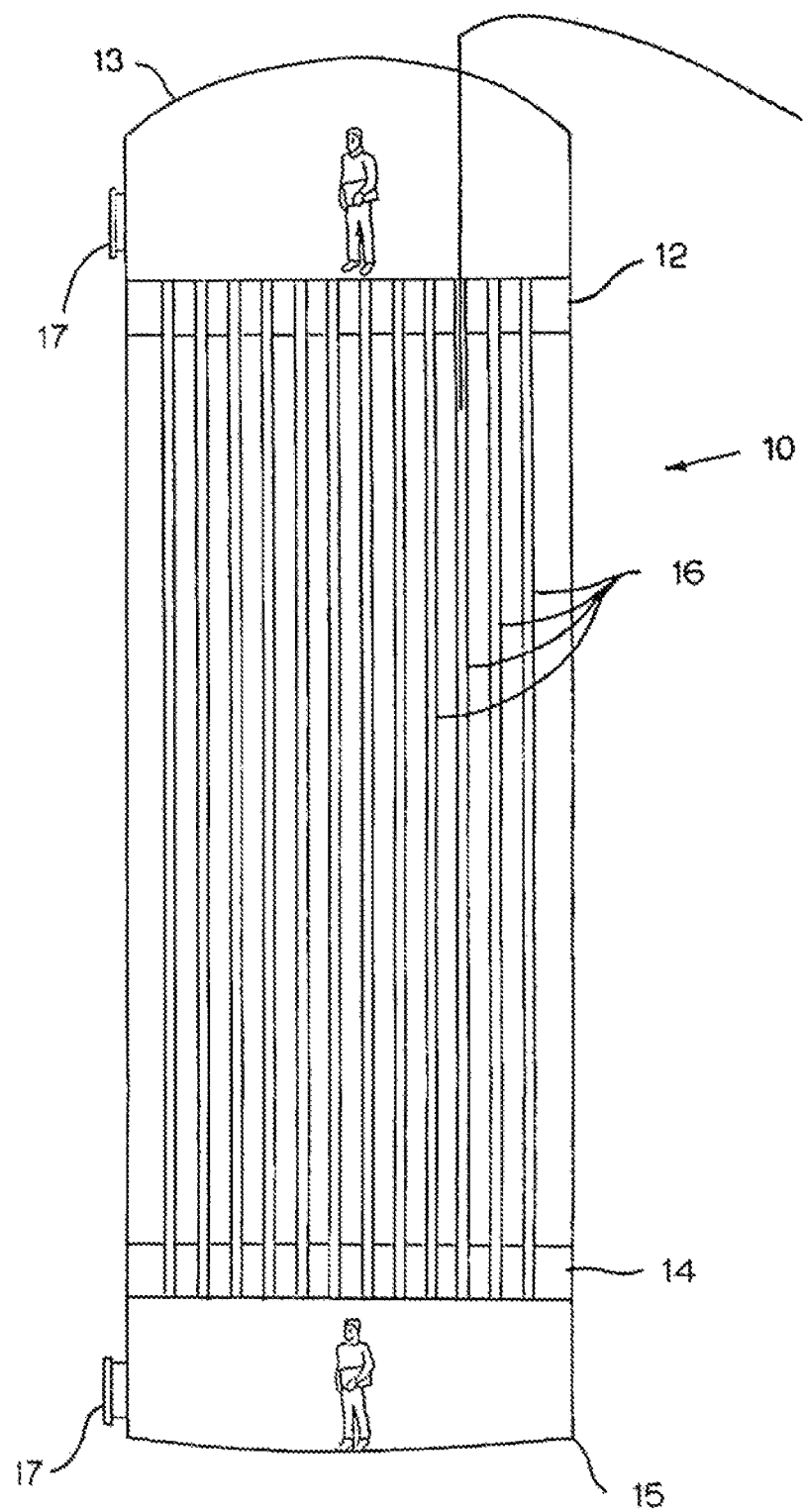
FIG. 1 is a schematic, section view of a shell and tube type of chemical reactor vessel.
Figure 2:
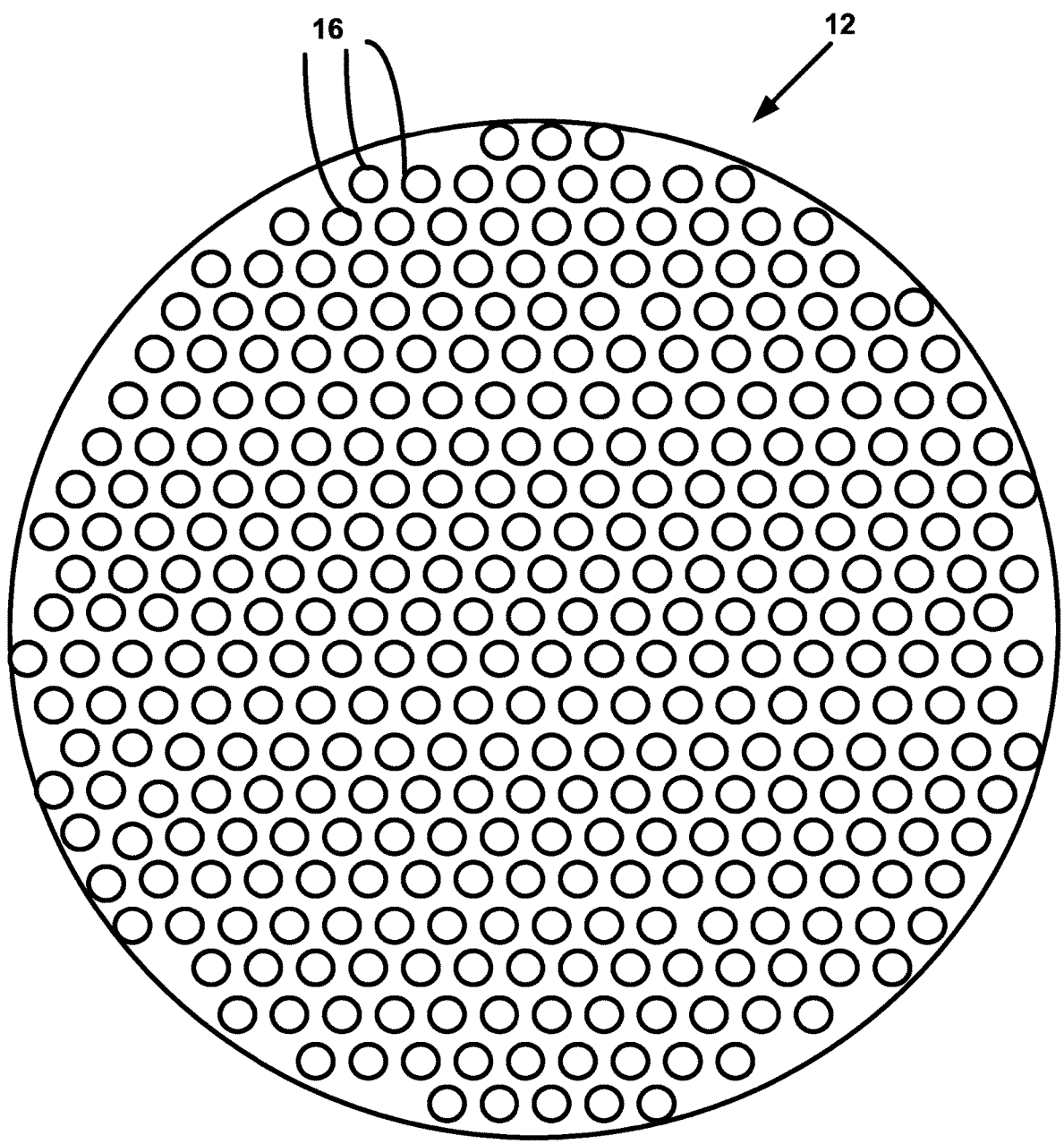
FIG. 2 is a schematic plan view of the upper tubesheet of the reactor vessel of FIG. 1, which is the same as the bottom tubesheet.

FIG. 1 depicts a typical chemical reactor vessel 10, which is a shell and tube heat exchanger, having an upper tubesheet 12 and a lower tubesheet 14 with a plurality of vertical reactor tubes 16 welded or expanded to the tubesheets 12, 14 to form a tightly packed tube bundle. There may be from one to many hundreds or even thousands of cylindrical reactor tubes 16 (See also FIG. 2) extending between the tubesheets 12, 14. Each reactor tube 16 has a top end secured to the upper tubesheet 12 and a bottom end secured to the lower tubesheet 14, and the reactor tubes 16 are open at both ends, except that there usually is a spring, clip or grid at the bottom end of each reactor tube 16 to retain pellets inside the reactor tube 16. The upper and lower tubesheets 12, 14 have openings that are the size of the outside diameter of the reactor tubes 16, with each reactor tube 16 being located in respective aligned openings in the upper and lower tubesheets 12, 14.

The reactor vessel 10 includes a top dome (or top head) 13 and a bottom dome (or bottom head) 15, as well as manways 17 for access to the tubesheets 12, 14 inside the vessel 10. The manways 17 are closed during operation of the reactor but are opened for access, such as during catalyst handling and tube cleaning operations. In this instance, the reactor tubes 16 are filled with pellets, including top and bottom layers of inert pellets and a column of catalyst pellets between the layers of inert pellets. The catalyst pellets facilitate the chemical reaction. (It may be noted that similarly-shaped shell and tube heat exchangers may be used for other purposes, such as for a boiler or other heat exchanger.) Other, non-catalyst pellets also may be inside the reactor tube.

Reactors have either fixed or removable heads. In this embodiment, the heads are fixed, and they include manways 17 at the top and at the bottom in order to provide access to their respective domes.

This particular reactor vessel 10 is fairly typical. Its tubes can range in length from 5 feet to 65 feet, and it is surrounded by a structural steel skid or framework (not shown), which includes stairways or elevators for access to the tubesheet levels of the reactor vessel 10 as well as access to intermediate levels, to a topmost level which may be located at or near the level of the top opening of the reactor vessel 10, and to a lower level which may be located at or near the level of the lower dome 15 of the reactor vessel 10. On a regular basis, which can be every 2 to 48 months or longer, as the catalyst becomes less efficient, less productive, or "poisoned", it is changed out, with the old catalyst being removed and a new charge of catalyst being installed in the reactor tubes 16 of the reactor vessel 10. Catalyst handling also may have to be done on an emergency basis, on an unplanned and usually undesirable schedule.

A catalyst change operation involves a complete shutdown of the reactor, which may result in considerable cost due to lost production. It is desirable to minimize the amount of time required for the catalyst change operation in order to minimize the lost production and accompanying cost caused by the reactor shutdown as well as for other reasons.

Part of the catalyst change operation involves cleaning out the inside surface of the reactor tubes 16 to remove any scale that may have formed inside the reactor tubes 16. The scale inhibits the heat transfer across the wall of the reactor tubes 16 and therefore should be removed prior to reloading catalyst pellets inside the reactor tubes 16.

Once the reactor tubes 16 have been cleaned, they may be loaded with new catalyst pellets. Typically, there will be a bottom portion of all the reactor tubes 16, adjacent the lower tubesheet 14, which should be loaded with inert pellets in lieu of active catalyst pellets. Similarly, a top portion of all the reactor tubes 16 adjacent the upper tubesheet 12 may be loaded with inert pellets. Each layer of pellets is loaded to a specific, desired elevation or level within the reactor tube 16.

Figure 3:
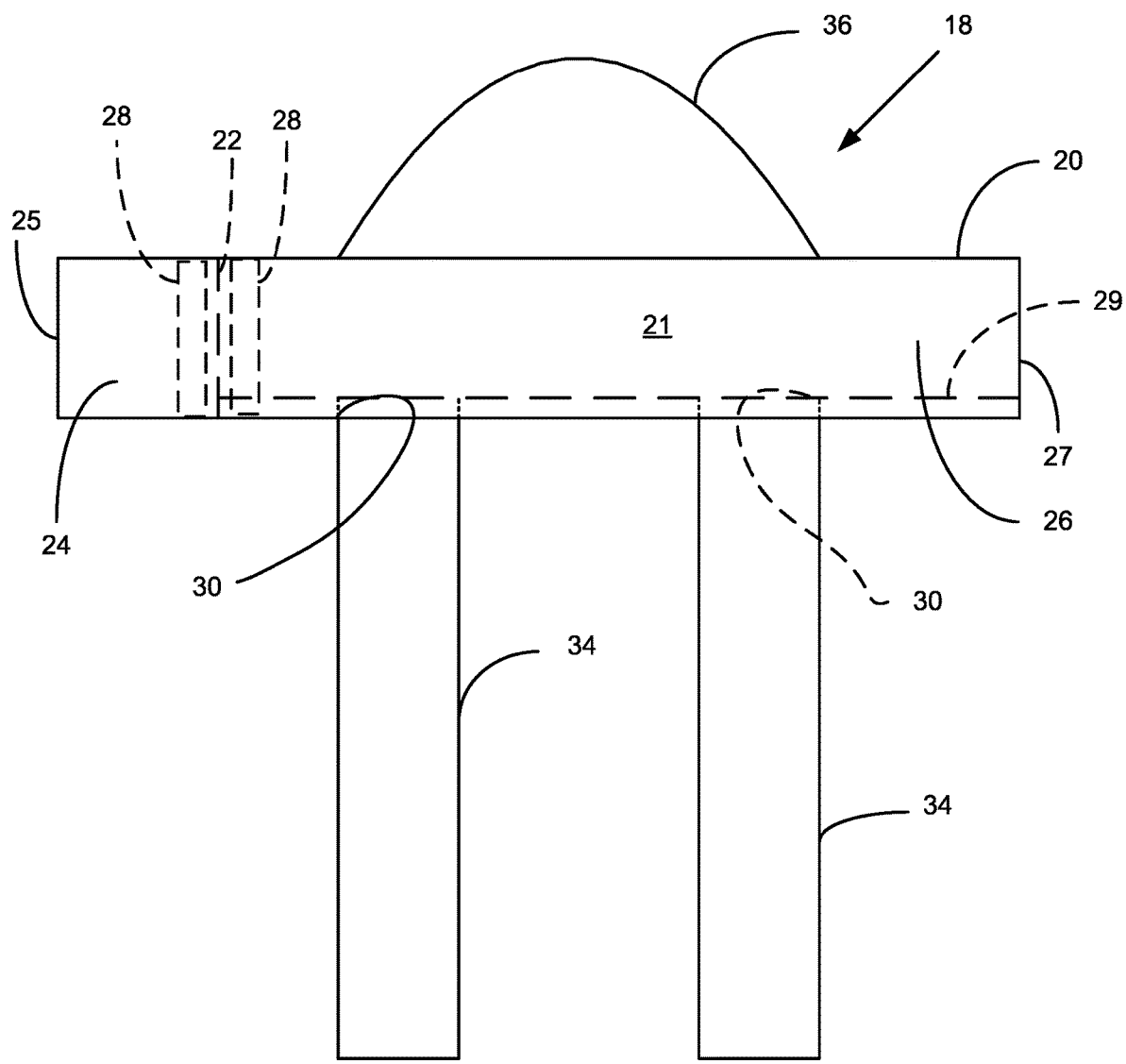
FIG. 3 is a schematic side view of an embodiment of a device for loading pellets into the tubes of a chemical reactor vessel.
Figure 4:
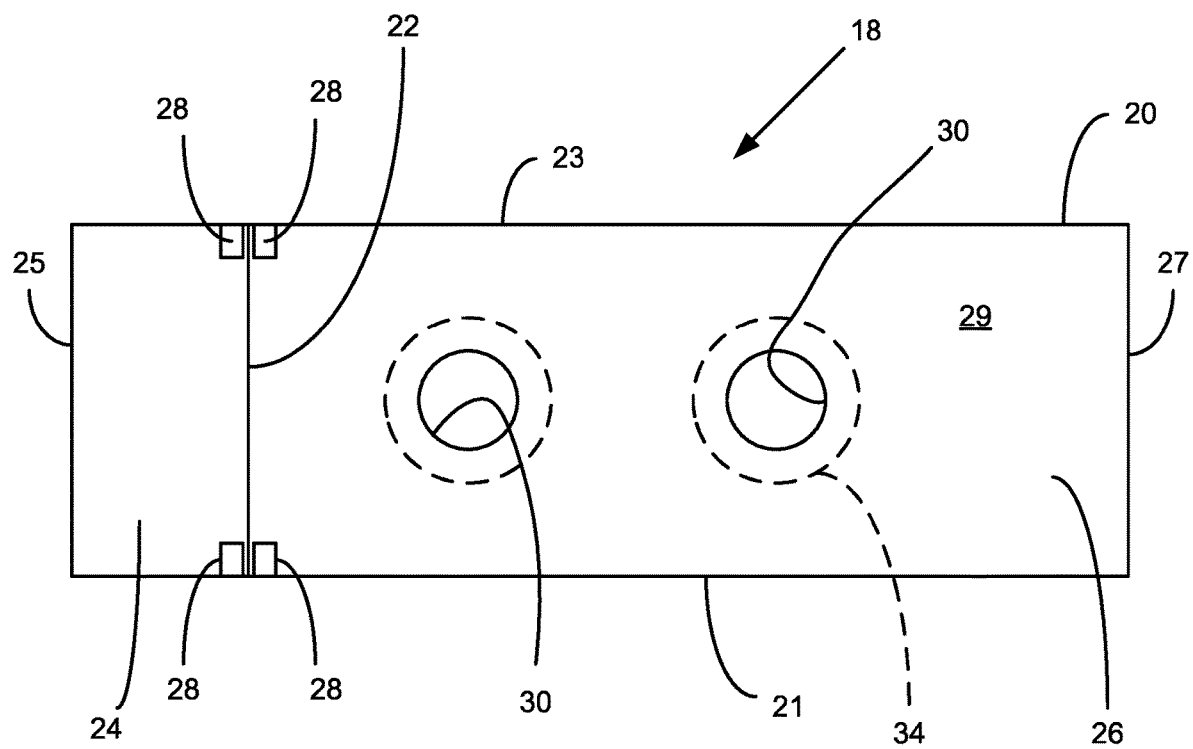
FIG. 4 is a schematic plan view of the device of FIG. 3.

FIGS. 3-8 show a pellet loading device 18 made in accordance with one embodiment of the present invention. Referring briefly to FIGS. 3 and 4, the pellet loading device 18 includes an open-top box 20 having a front wall 21, rear wall 23, left wall 25, right wall 27, and bottom wall 29, defining a length from the left wall 25 to the right wall 27, a width from the front wall 21 to the rear wall 23, and a depth (the height of the walls 21, 23, 25, 27 above the bottom wall 29). A movable dam 22 separates the box 20 into two compartments—an isolation compartment 24 and a containment compartment 26. The box 20 includes four guides 28, two of the guides 28 secured to the rear wall of the box 20 and two of the guides 28 secured to the front wall of the box 20, forming front and rear tracks to support the movable dam 22 in an upright position. This allows the user to slide the dam 22 up to remove the dam 22 from the box 20 (moving the dam to the open position) and then to slide the dam 22 down to close the dam 22. The dam 22 alternatively could be a block or wad of material that would keep its position without the need for guides and that could just be set down for the closed position and lifted up for the open position.

Figure 6:
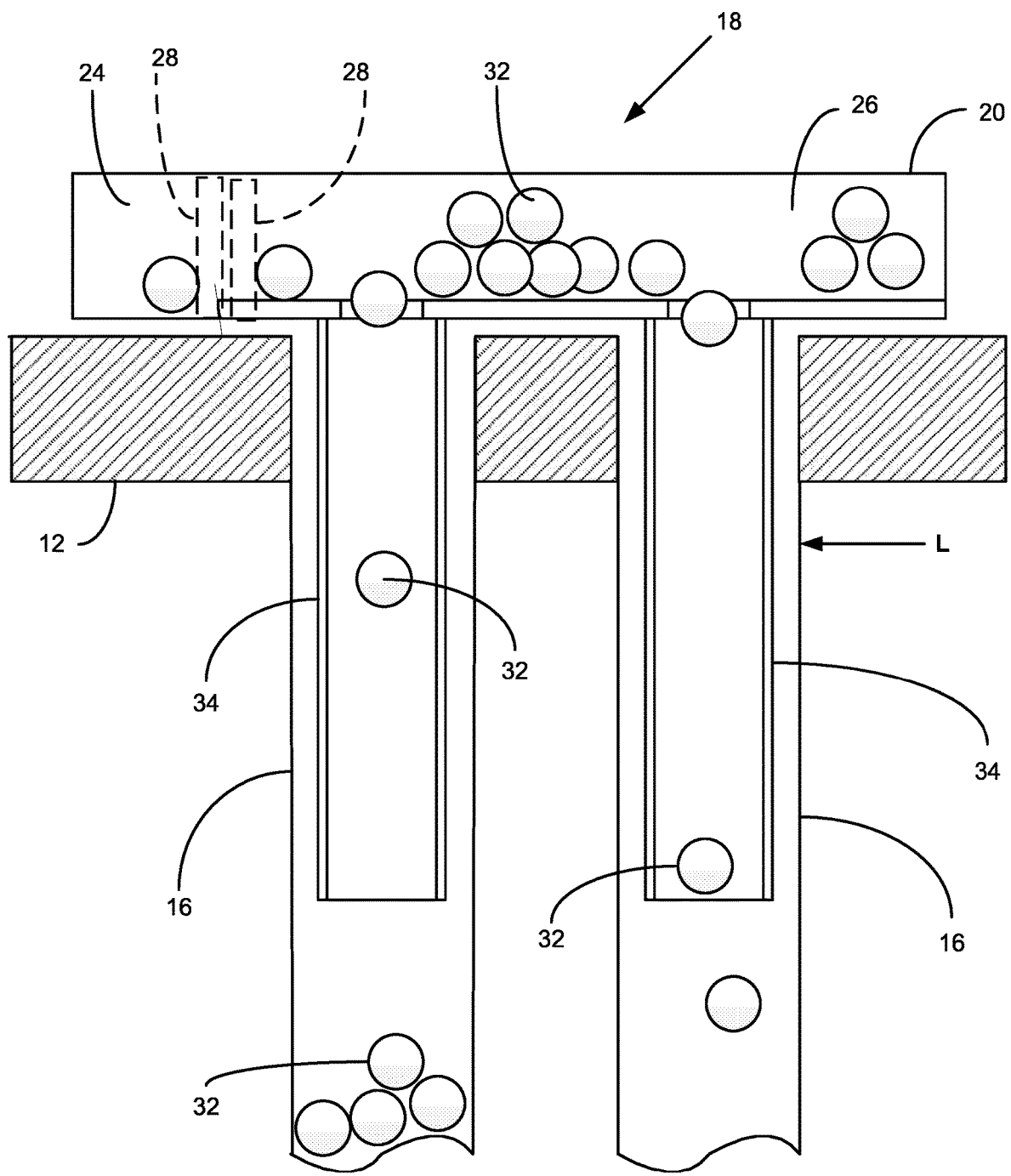
FIG. 6 is a view, similar to that of FIG. 5, but showing some of the pellets being loaded into the reactor tubes.

In this embodiment 18, the bottom wall 29 of the containment compartment 26 defines two openings 30 and has a loading tube 34 secured to and projecting downwardly from the bottom wall 29 at each opening 30 to allow pellets 32 to fall through from the containment compartment 26 into the loading tubes 34, as shown in FIG. 6. In this embodiment, each loading tube 34 is concentric with its respective opening 30 and has a larger inside diameter than its respective opening 30. Finally, the pellet loading device 18 includes a bail-type handle 36 mounted to the box 20 (note: the handle 36 is only shown in FIG. 3 for clarity) so the loading device 18 can easily be picked up and carried manually by the user. Of course, even if there is not a handle 36, the user can just pick up the box by manually grasping the box itself in order to move it.

Figure 5:
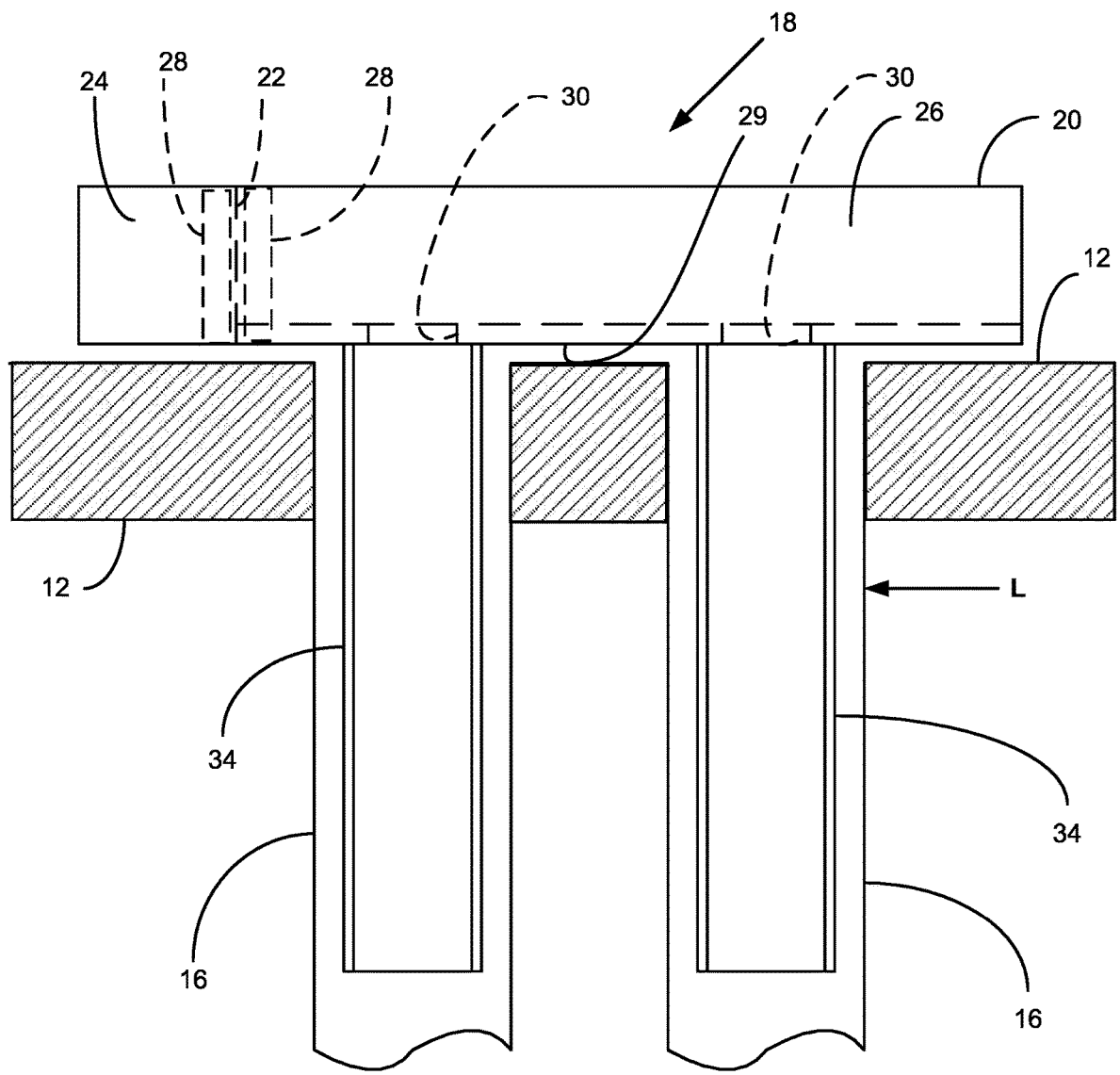
FIG. 5 is a schematic, broken-away, side sectional view of the upper tubesheet of FIG. 2 with the device of FIG. 3 inserted into two of the tubes.
Figure 7:
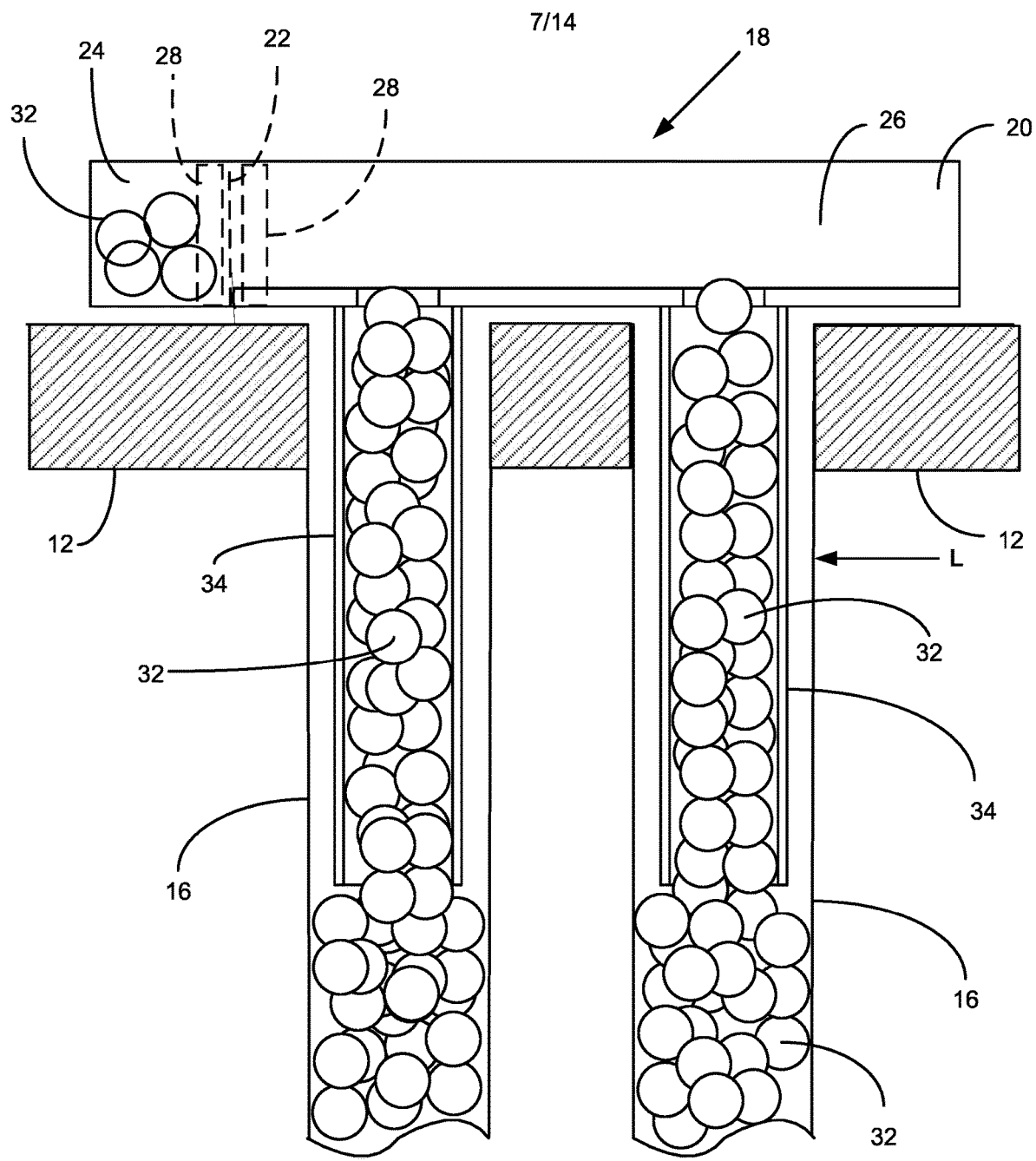
FIG. 7 is a view, similar to that of FIG. 6, but with the pellets loaded into the reactor tubes and with the loading device still inserted into the tubes and with the surplus pellets isolated in the containment compartment of the loading device.
Figure 8:
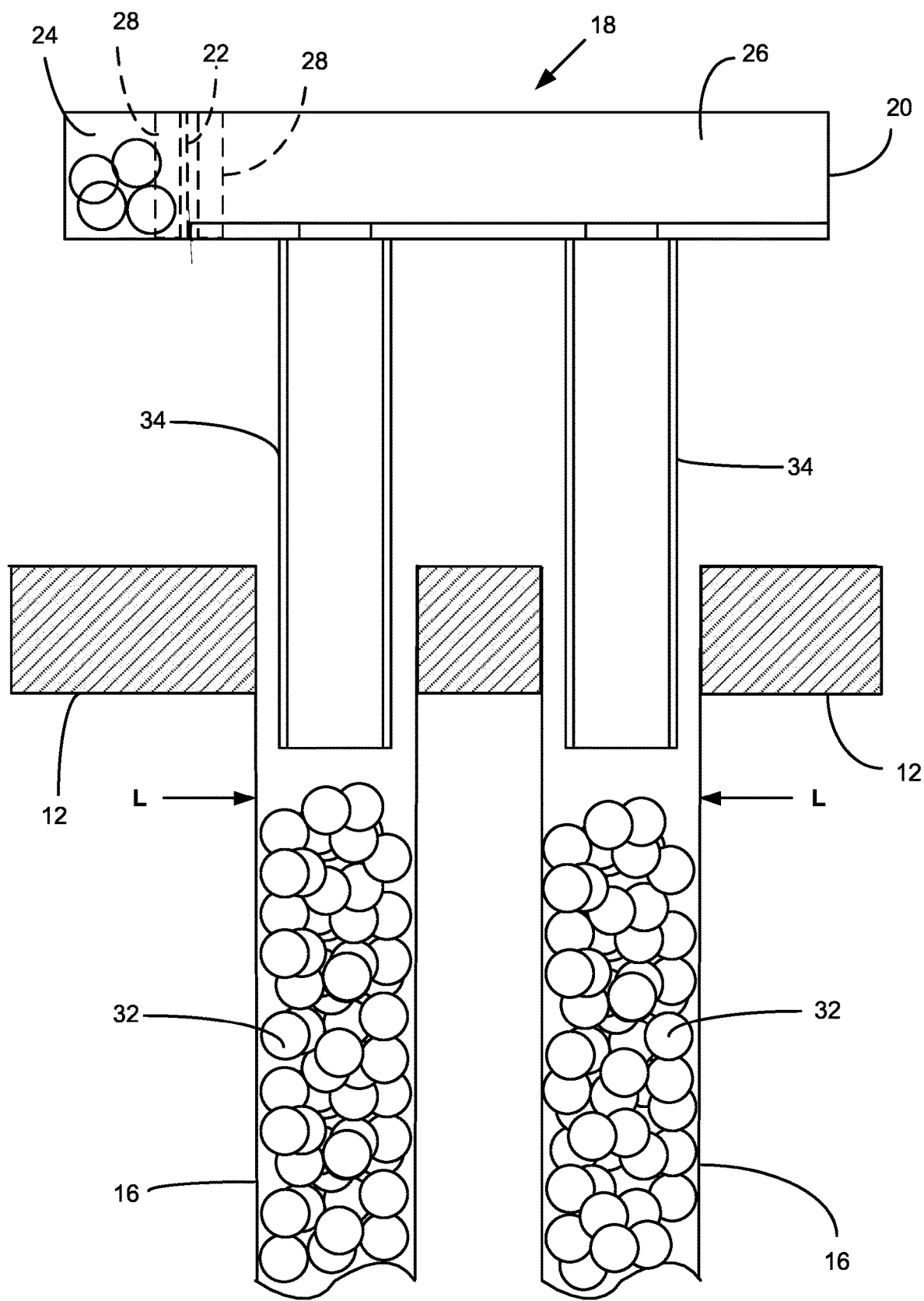
FIG. 8 is a view, similar to that of FIG. 7, but with the pellets loaded into the reactor tubes and with the loading device almost fully retrieved from the tubes.

It should be noted that the loading tubes 34 are spaced apart and sized to fit properly into the reactor tubes 16, as shown in FIGS. 5-8. Only two of the loading tubes 34 are shown, but it is understood that the pellet loading device 18 may have any desired number of these loading tubes 34, ranging from as few as one to as many as may be comfortably handled by the user. The loading tubes 34 are sized to fit inside the reactor tubes 16, so their outside diameter is slightly smaller than the inside diameter of the reactor tubes 16. Furthermore, as explained in more detail below, the length of these loading tubes 34 is carefully chosen so that, when the top layer of pellets is being loaded, as shown in FIG. 7, the volume of pellets 32 the loading tubes 34 can hold when full is such that, when the pellet loading device 18 is retrieved from the reactor tubes 16 and the top layer of pellets 32 has fallen out of the loading tubes 34 and into the reactor tubes 16, the top layer of pellets is at the desired level L, as shown in FIG. 8. To use the pellet loading device 18, the user first places the device 18 such that its loading tubes 34 are fully inserted into the reactor tubes 16 to be loaded with pellets, as shown in FIG. 5. In this position, the bottom 29 of the box 20 is resting on the top tube sheet 12. The user then removes the dam 22 and proceeds to fill the box 20 with pellets 32 while at the same time brushing or otherwise coaxing the pellets 32 through the openings 30 and into the loading tubes 34, as shown in FIG. 6, until the pellets 34 reach the top of the loading tubes 34, as shown in FIG. 7. Once the loading tubes 34 are full, the user takes the pellets 32 remaining in the box 20 and brushes them into the isolation compartment 24 and replaces the dam 22, putting the dam 22 in the closed position, to ensure that the remaining pellets 32 won't roll back into the containment compartment and accidentally fall into the reactor tubes 16 being filled. Of course, other known types of movable dams alternatively could be used to block the flow of pellets 32. He then lifts the pellet loading device 18, making sure that any pellets 32 that are still in the loading tubes 34 fall through the loading tubes 34 and into their respective reactor tubes 16, as shown in FIG. 8. If the length of the loading tubes 34 has been selected properly, the pellets 32 will fill the reactor tubes 16 up to the desired level "L".

A second embodiment of a pellet loading device 18' is shown in FIGS. 9-19. This pellet loading device 18' may be used for loading the top pellet charge, the bottom pellet charge, or any other pellet charge. As was noted earlier, the bottom pellet charge is typically only a fraction (between one half and one tenth or less) of the top pellet charge, and the bottom pellet charge, or any other pellet charge other than the top pellet charge, is not able to rely on filing the reactor tubes 16 until the loading tubes 34 are full in order to reach the desired level within the reactor tubes 16. Also, the pellets for the bottom charge fall the full length of the reactor tubes 16, which can be as much as 65 feet or more, which may create a problem in which some of the pellets 32 bridge across the reactor tube 16 before falling fully to the bottom of the reactor tube 16. Bridging is a highly undesirable condition that may result in incomplete and uneven loading of catalyst pellets in the reactor tubes 16. As described in detail below, the pellet loading device 18' of FIGS. 9-19 addresses these issues.

This pellet loading device 18' is very similar to the previous pellet loading device 18 of FIG. 5, including a box 20' divided in two compartments—a containment compartment 26' and an isolation compartment 24' which are separated by a movable/removable dam 22', wherein the dam 22' is guided and held upright by the guides 28'. In this embodiment, two loading tubes 34' project downwardly from the bottom wall 29' of the box 20', the loading tubes 34' being in fluid communication with the box 20' via the openings 30'. The most significant difference between this pellet loading device 18' of FIG. 9 and the previous pellet loading device 18 of FIG. 5 is the use of a reciprocating choke plate 36.

Figure 14:
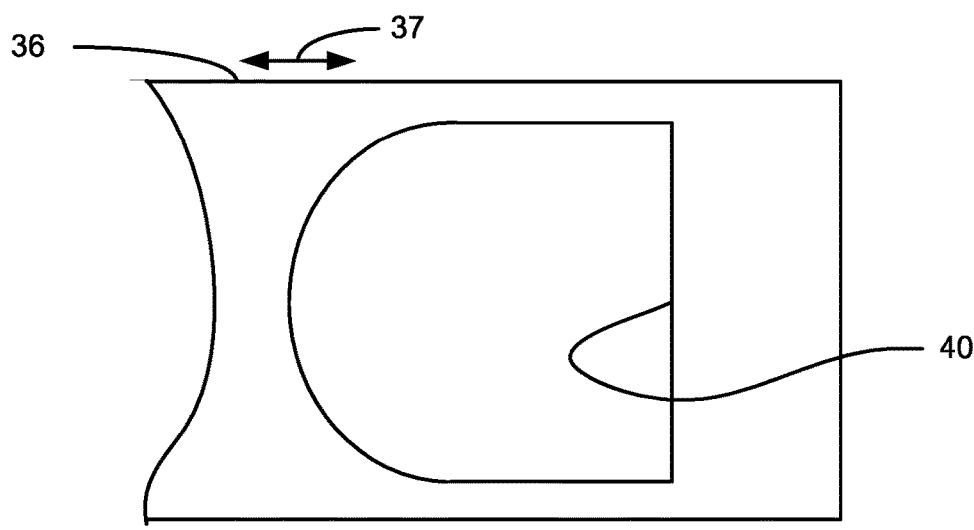
FIG. 14 is a plan view of the right portion of the choke plate of the device of FIG. 9.
Figure 15:
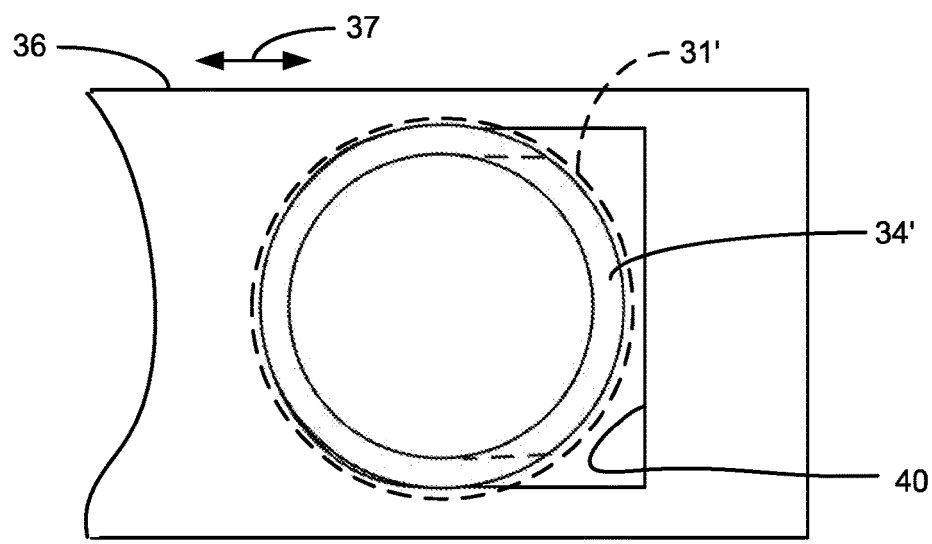
FIG. 15 is a plan view of the portion of the choke plate of FIG. 14 mounted on the loading tube of FIGS. 9-11, with the choke plate in the open position.
Figure 16:
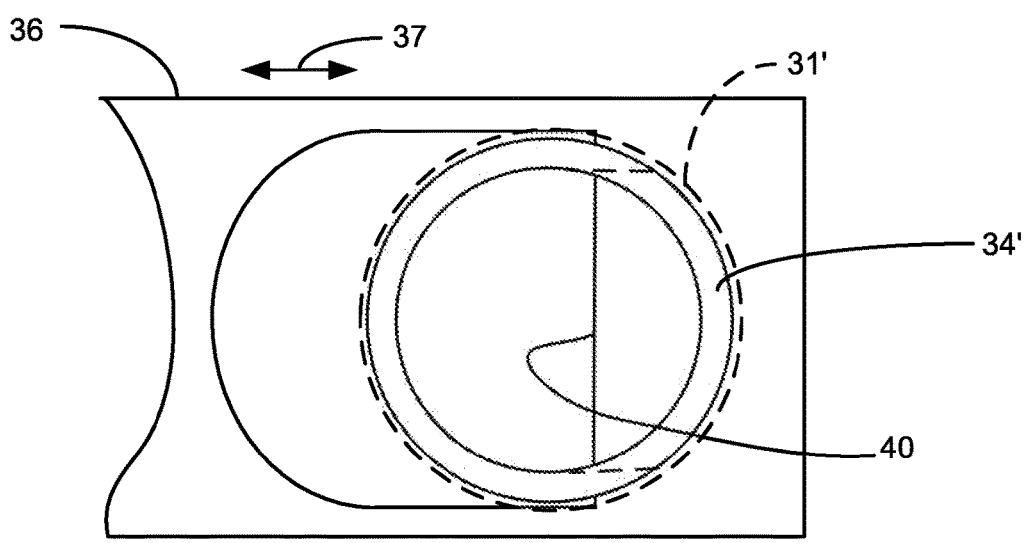
FIG. 16 is a view similar to FIG. 15, but with the choke plate in the partially-closed, or choked position.

The choke plate 36 is mounted on an assembly plate 48, which rests on the upper tube sheet 12. Referring to FIGS. 14-16, the loading tubes 34' extend through openings 40 in the choke plate 36 and through openings 31' in the assembly plate 48. The loading tubes 34' are fixed to the assembly plate 48 at a desired height by means of clips, by welding, by gluing, or by other known means, so the box 20' is at a fixed elevation above the upper tube sheet 12.

Figure 9:
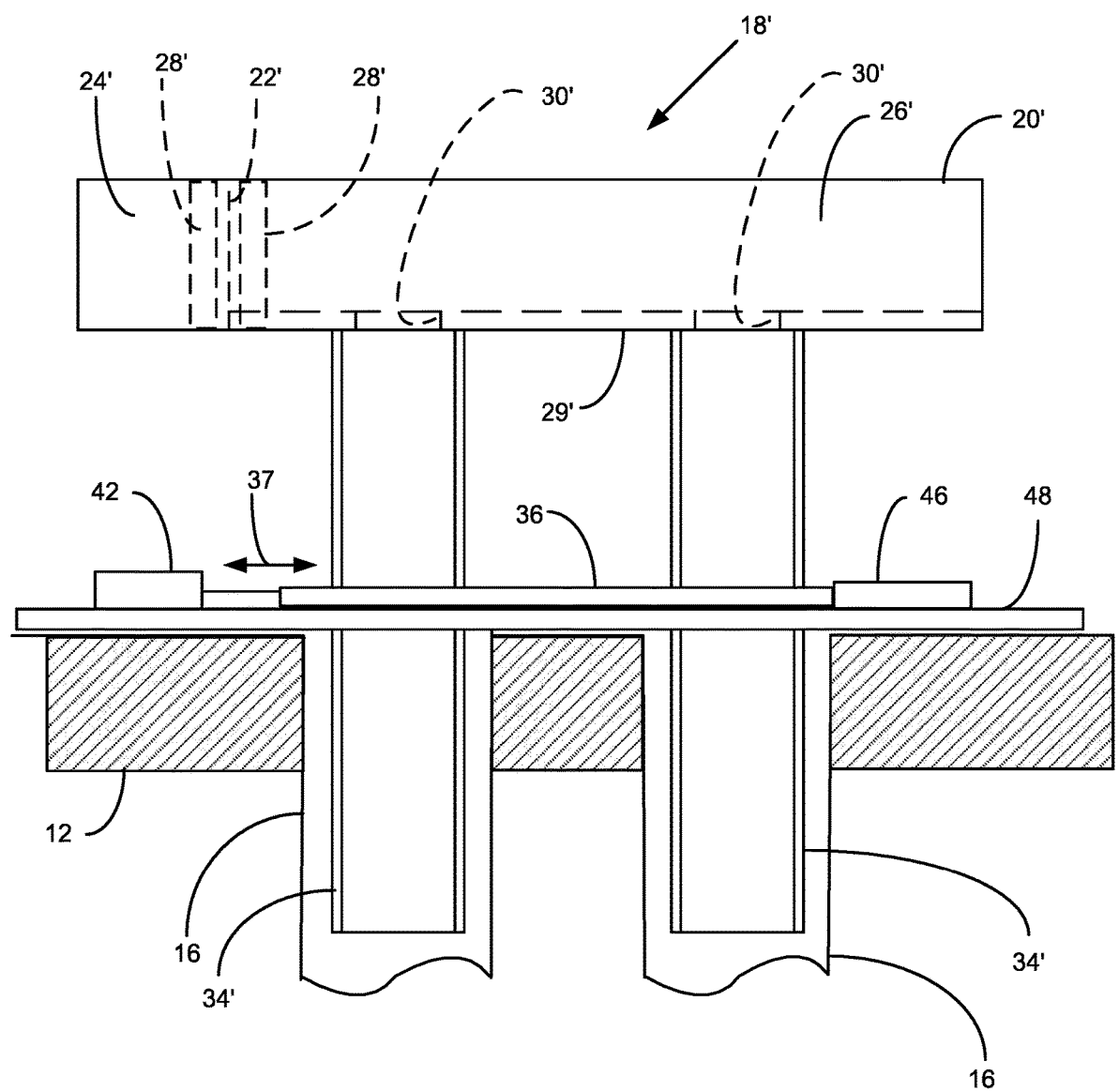
FIG. 9 is a schematic, broken-away, side sectional view of another embodiment of a device for loading pellets into tubes of a chemical reactor vessel as it is being inserted into the reactor tubes.
Figure 10:
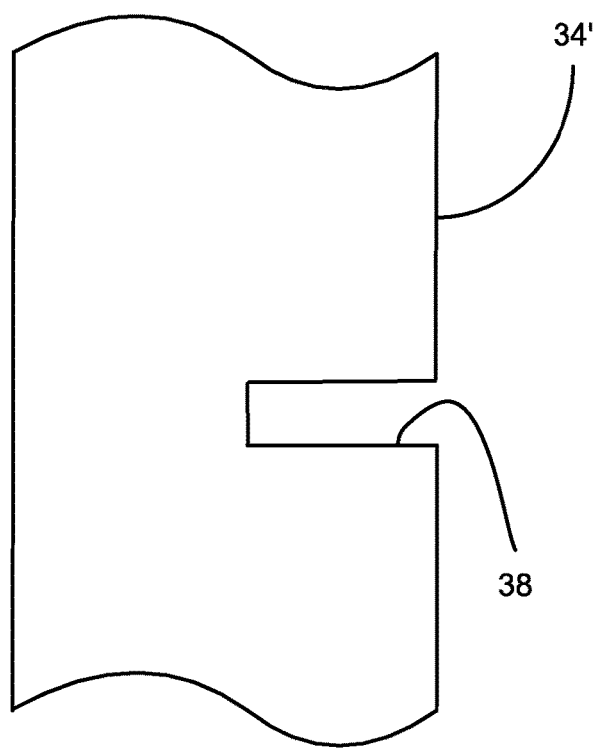
FIG. 10 is a broken away, enlarged side view of one of the loading tubes of the device of FIG. 9.

As shown in FIG. 10, a slotted opening 38 is cut about ⅓ of the way across each of the loading tubes 34' at a desired elevation (the same elevation for all the loading tubes 34', which is slightly above the elevation of the assembly plate 48). The choke plate 36 (See FIGS. 9 and 14-16) is mounted at the elevation of the slotted openings 38 of the loading tubes 34'. It can be seen in FIGS. 14-16 that the openings 40 in the choke plate 36 have a reverse "D" shape. Only the right-most opening 40 of the choke plate 36 is shown in FIGS. 14-16, but the choke plate 36 shown in FIG. 9 has two openings 40, one for each loading tube 34', and it is understood that there are as many openings 40 as there are loading tubes 34' in the pellet loading device 18'.

The choke plate 36 is aligned with the slots 38 in the loading tubes 34' and moves left and right as shown by the arrow 37 relative to the loading tubes 34'. When the choke plate moves to the right, as shown in FIG. 15, it opens the loading tube 34' and allows pellets to flow through the loading tube 34'. When the choke plate 36 moves to the left, as shown in FIG. 16, a portion of the choke plate enters into the slotted opening 38 of the loading tube 34', partially closing off the loading tube 34', and preventing pellets from flowing through the loading tube 34'. (When the choke plate 36 chokes down the size of the opening through the loading tube 34' to the position shown in FIG. 16, the remaining opening is small enough that pellets will not flow through.)

Figure 17:
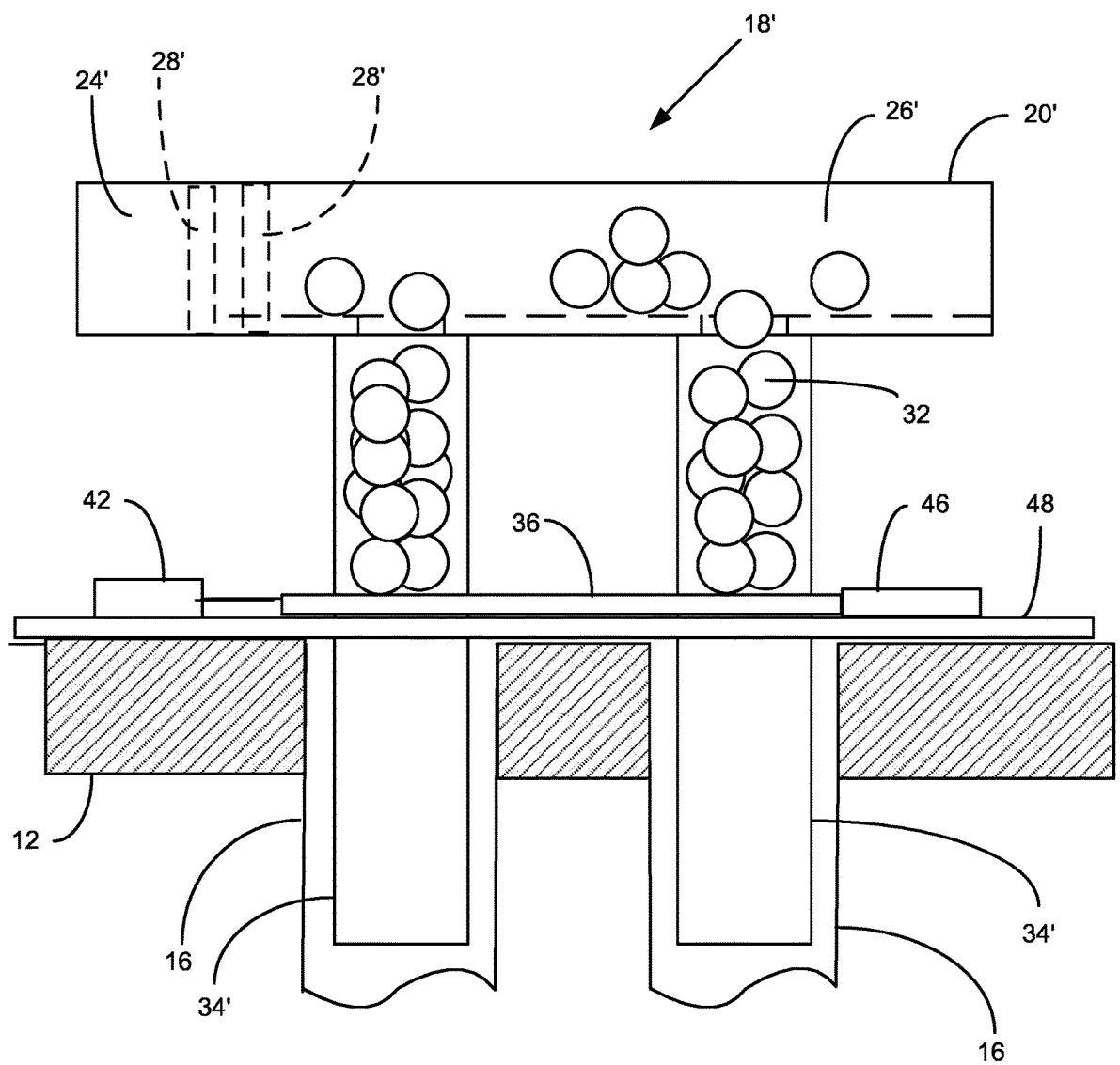
FIG. 17 is a view similar to FIG. 9, but with some of the pellets being loaded into the loading tubes while the choke plate is in the choked position.

As shown in FIG. 9, the left end of the choke plate 36 is secured to a spring mechanism 42 which is mounted to the assembly plate 48 and biases the choke plate 36 to the left, toward the restricted-opening position shown in FIG. 16. This restriction of the opening in the loading tubes 34' is sufficient to prevent the pellets 32 from falling through the loading tubes 34', as shown in FIG. 17.

The other end of the choke plate 36 is attached to a linear actuator 46 which is mounted to the assembly plate 48 and which, when it operates, rapidly reciprocates the choke plate 36 back and forth between the restricted-opening position as shown in FIG. 16 and the open position as shown in FIG. 15. This linear actuator 46 may be a solenoid, pneumatic cylinder, an air bladder, or any other type of linear actuator. This linear actuator 46 is preferably operated and controlled using a flow control or a computerized controller (not shown). Alternatively, the linear actuator 46 may be omitted, and the choke plate 36 may be manually shuttled back and forth.

When the choke plate 36 is moved back and forth by means of the linear actuator 46 or by hand, it allows pellets 32 to drop through the loading tubes 34' and into the reactor tubes 16 in a restricted manner, so the pellets 32 flow all the way down without bridging.

To use this pellet loading device 18' for a bottom pellet charge, the user first inserts the loading tubes 34' it into the reactor tubes 16 to be loaded, as shown in FIG. 9, until the assembly plate 48 rests on the upper tube sheet 12. At this point, the choke plate 36 is in the choked position shown in FIG. 17. The user then removes the dam 22' and proceeds to fill the box 20' with pellets 32 while at the same time brushing or otherwise coaxing the pellets 32 through the openings 30' and into the loading tubes 34', as shown in FIG. 17, until the loading tubes 34' are loaded.

Figure 18:
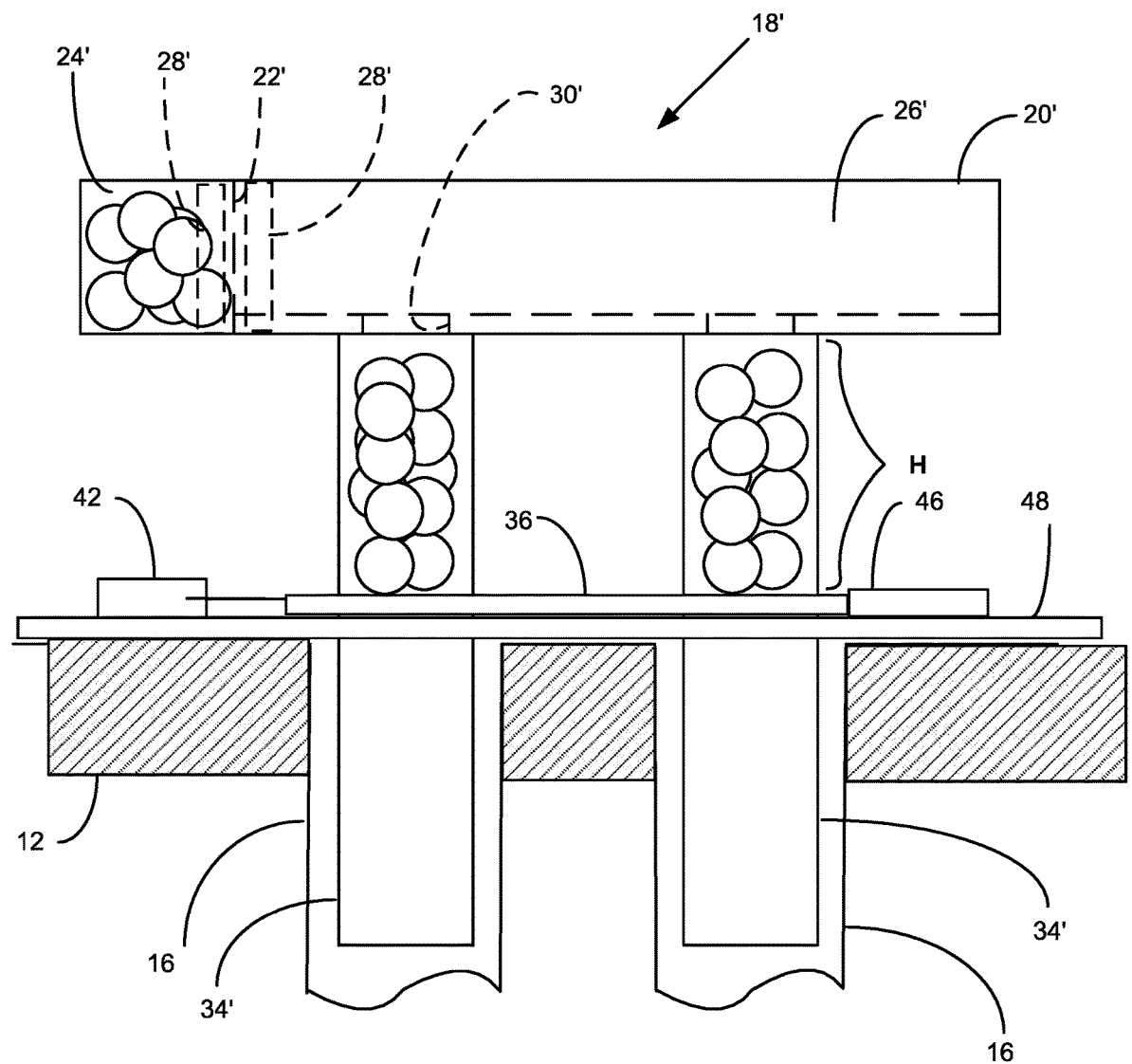
FIG. 18 is a view similar to FIG. 17, showing the loading tubes loaded and the surplus pellets isolated in the containment compartment of the loading device.

Once the loading tubes 34' are full, the user brushes the pellets 32 remaining in the box 20' into the isolation compartment 24' and replaces the dam 22' to ensure that the remaining pellets 32 will not roll back and accidentally fall into the reactor tubes 16 being filled. This situation is shown in FIG. 18. At this point, a desired charge of pellets 32 is in each loading tube 34', ready to be installed in the respective reactor tubes 16.

Figure 19:
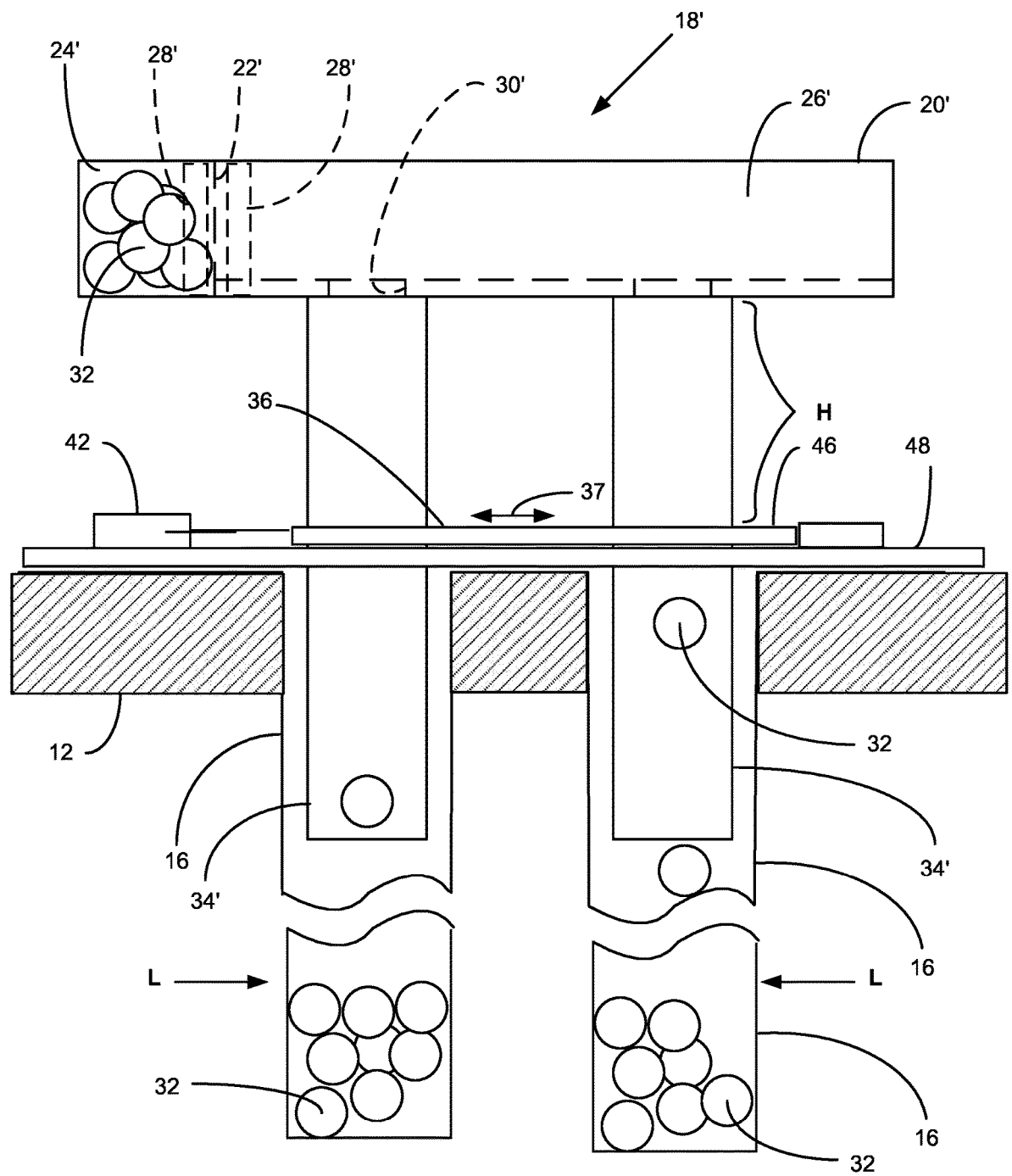
FIG. 19 is a view similar to FIG. 18, but showing the choke plate being rapidly reciprocated back and forth as shown by the arrow 37, moving repeatedly from the choked position to the open position and back again to allow the pellets in the loading tubes to drop down into the reactor tubes.

As shown in FIG. 19, the user then energizes the actuator 46 or manually moves the choke plate 36 back and forth in the direction of the arrow 37 shown in FIG. 19 to enable a controlled flow of the pellets 32 past the choke plate 36, through the loading tubes 34', and down the reactor tubes 16. The first pellets 32 fall onto the springs or clips (not shown) at the bottom of the reactor tubes, and the ensuing pellets 32 fall on top of the previous pellets 32 that already have come to rest. If the height "H" (See FIGS. 18 and 19) of the loading tubes 34' from the slotted opening 38 (or essentially from the top of the choke plate 36) to the top of the loading tubes 34' (essentially to the bottom surface of the box 20') has been properly selected, the pellets 32 will fall into the reactor tubes 16 and fill the reactor tubes 16 up to the desired elevation or level "L" for the bottom charge. This arrangement may be used to load additional measured charges of pellets 32 by repeating the process of restricting the openings in the loading tubes 34', loading pellets into the loading tubes 34', and then reciprocating the choke plate 36 until the full measured charge of pellets falls down into the reactor tubes 16.

Figure 12:
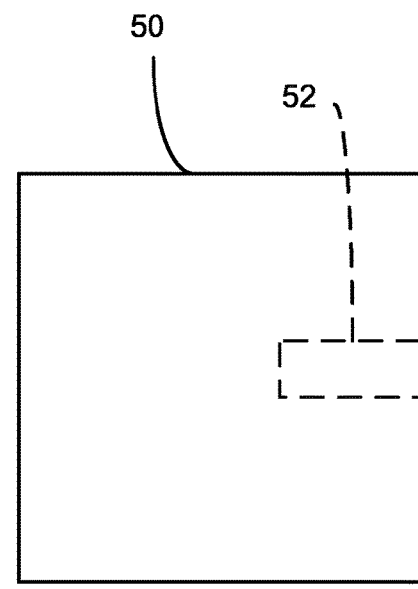
FIG. 12 is a side view of a sleeve for covering the slotted opening shown in FIG. 10.
Figure 11:
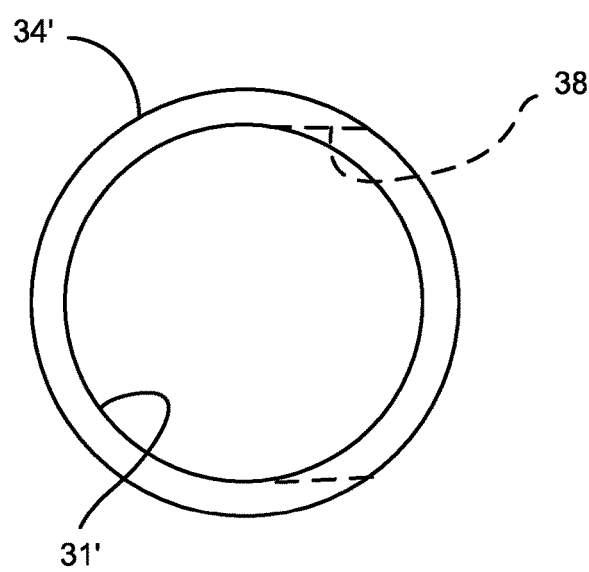
FIG. 11 is a plan view of the loading tube of FIG. 10.
Figure 13:
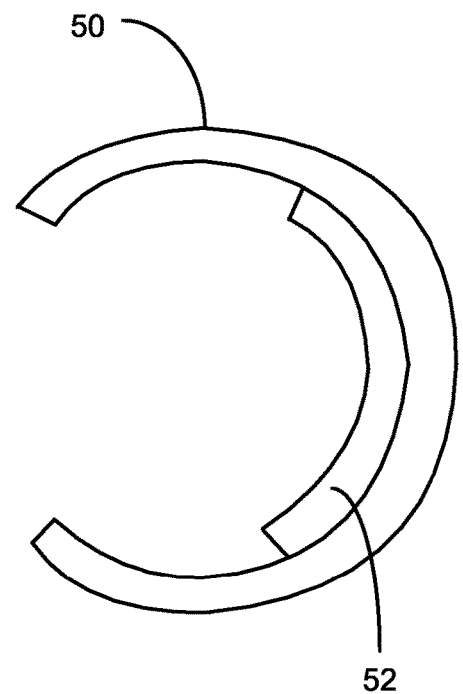
FIG. 13 is a plan view of the sleeve of FIG. 12.

This same pellet loading device 18' may be used to load a top pellet charge by removing the choke plate assembly, including the assembly plate 48, choke plate 36, spring mechanism 42 and linear actuator 46, and allowing the bottom wall 29' of the box 20' to rest on the upper tube sheet 12, such that the pellet loading device 18' becomes practically identical to the pellet loading device 18 of FIGS. 5-8, described earlier. To ensure that pellets 32 do not hang up at the slotted opening 38, the user may snap on a sleeve 50, as shown in FIGS. 12 and 13. The sleeve 50 defines a ledge 52 projecting inwardly to fill the slot that has been cut in the wall of the loading tube 34'. The sleeve 50 fits snugly over the loading tube 34', and the ledge 52 restores the portion of the wall of the loading tube 34' that had been cut away to form the slot 38, resulting in a smooth inner wall of the loading tube 34' throughout the full length of the loading tube 34'.

It will be obvious to those skilled in the art that modifications may be made to the embodiments described above without departing from the scope of the invention as claimed.

What is claimed is:

1. A portable pellet loading device, comprising:
an open-top box of a size that can be carried by a person, said open-top box having a front wall; rear wall; left wall; right wall; and bottom wall; at least one opening defined in said bottom wall for allowing pellets to flow out of the box; a loading tube secured to and projecting downwardly from said bottom wall at said opening; and a movable dam in said box, said movable dam having a closed position, which divides said box into separate compartments, preventing the flow of pellets between said separate compartments, one of said separate compartments being an isolation compartment spaced away from said opening, and another of said separate compartments being a containment compartment, in communication with said opening; said dam also having an open position, which permits pellets to flow between said isolation compartment and said containment compartment.

2. A portable pellet loading device as recited in claim 1, wherein said opening has a diameter, and said loading tube has an inside diameter larger than said diameter of said opening.

3. A portable pellet loading device as recited in claim 2, wherein said movable dam comprises tracks mounted on said box, and a plate slidably mounted in said tracks, wherein said plate is slid downwardly to said closed position and upwardly to said open position.

4. A portable pellet loading device as recited in claim 3, and further comprising a bail-type handle mounted on said box for carrying said box.

5. A portable pellet loading device as recited in claim 2, and further comprising a slotted opening defined in said loading tube spaced a distance below said bottom wall; and a movable choke plate movably mounted through said slotted opening for reciprocating motion to open and close said loading tube at said choke plate.

6. A portable pellet loading device as recited in claim 5, and further comprising a linear actuator connected to said movable choke plate.

7. A method for loading pellets into reactor tubes, comprising the steps of:
providing a portable open top loading box having a bottom wall defining at least one opening and a loading tube secured to said bottom wall and projecting downwardly from said bottom wall at said opening;
manually lowering said loading tube into a reactor tube; putting pellets into said open top box and moving the pellets around in said open top box so some of said pellets fall through said opening and into said loading tube and others of said pellets remain in said loading box;
then, when enough pellets have been loaded into said loading tube, sweeping the remaining pellets in said loading box over to an isolation chamber in said loading box, said isolation chamber being spaced away from said opening, and closing a dam to separate said isolation chamber from said opening; then picking up said loading box and allowing any pellets still in said loading tube to fall into said reactor tube, without additional pellets falling from said loading box through said opening.

8. A method for loading pellets into reactor tubes as recited in claim 7, and further providing a reciprocating choke plate mounted through a slotted opening in said loading tube spaced a distance below said bottom wall, wherein moving said choke plate to an open position allows pellets to fall through said loading tube past said choke plate, and moving said choke plate to a closed position prevents pellets from falling through said loading tube past said choke plate; and further including the step of reciprocating said choke plate back and forth between said open and closed positions to allow pellets to flow through said loading tube into said reactor tube.

9. A method for loading pellets into reactor tubes as recited in claim 8, wherein said dam comprises tracks mounted on said box and a plate slidably mounted in said tracks, wherein said plate is slid downwardly to close said dam.

10. A method for loading pellets into reactor tubes as recited in claim 9, wherein the step of picking up said loading box includes manually grabbing a bail-type handle mounted on said loading box.

* * * * *